US012241596B1

(12) United States Patent
Okoyo

(10) Patent No.: US 12,241,596 B1
(45) Date of Patent: Mar. 4, 2025

(54) PIPELINE INTRUDER LOCATOR SYSTEM

(71) Applicant: George Okotako Okoyo, Port Harcourt (NG)

(72) Inventor: George Okotako Okoyo, Port Harcourt (NG)

( * ) Notice: Subject to any disclaimer, the term of this patent is extended or adjusted under 35 U.S.C. 154(b) by 0 days.

(21) Appl. No.: 18/754,443

(22) Filed: Jun. 26, 2024

(51) Int. Cl.
*G01K 1/024* (2021.01)
*F17D 5/00* (2006.01)
*G08B 13/22* (2006.01)

(52) U.S. Cl.
CPC ............... *F17D 5/00* (2013.01); *G08B 13/22* (2013.01)

(58) Field of Classification Search
CPC .................................. F17D 5/00; G08B 13/22
See application file for complete search history.

(56) References Cited

U.S. PATENT DOCUMENTS 6,243,483 B1 6/2001 Petrou et al.
7,856,157 B2 12/2010 Beinhocker
9,983,293 B2 5/2018 Farhadiroushan et al.
10,275,402 B2 4/2019 Guerriero et al.
2006/0068754 A1* 3/2006 Goldfarb .................. F17D 5/00 455/410
2006/0129338 A1* 6/2006 Turley ...................... F17D 5/00 702/51
2010/0156637 A1 6/2010 Samuelson
2013/0043887 A1* 2/2013 Ziolkowski ............... F17D 5/00 324/649
2016/0377232 A1* 12/2016 Boker ....................... F16L 1/06 709/217
2020/0158290 A1* 5/2020 Hlady ..................... G01S 7/481
2022/0236115 A1* 7/2022 Tailor ....................... H04W 4/38
2022/0276116 A1 9/2022 Sadovnychiy et al.
2023/0091659 A1* 3/2023 Kendall ................. H04N 7/183 701/11

FOREIGN PATENT DOCUMENTS

CN 102573052 A 7/2012
CN 107238833 A 10/2017
WO 2023209413 A1 11/2023

* cited by examiner

*Primary Examiner* — Hongmin Fan
(74) *Attorney, Agent, or Firm* — Argus Intellectual Enterprise, LLC; Daniel Enea; Jordan Sworen

(57) ABSTRACT

A pipeline intruder locator system is provided. The pipeline intruder locator system comprises a comprehensive mapping system, such as fiber-optic sensors and satellite surveillance, to delineate the entire pipeline right of way (ROW). Equipped with sensors, the mapping system detects unauthorized presence within the ROW, tags the intruder, and assigns a unique identification number to each intruder detected. A follow-on locator system continues to track the intruder's movements inside or outside the ROW in real-time using geolocation technologies. This real-time tracking information is transmitted to security agencies for prompt action, allowing for the effective arrest and prosecution of the intruders.

11 Claims, 3 Drawing Sheets

PIPELINE INTRUDER LOCATOR SYSTEM

BACKGROUND OF THE INVENTION

The present invention relates to a pipeline intruder locator system. More specifically, the invention provides a system to detect and track unauthorized intrusions and activities within pipeline rights of way (ROWs).

Pipeline infrastructures, particularly in regions like Nigeria, Mexico, Iraq, Colombia, Russia, and India, are critical to the economic stability and energy supply of the nation. However, these infrastructures are frequently targeted for illegal activities, such as crude oil theft, and pipeline vandalism. This leads to significant financial losses and also poses severe risks to the environment and public safety. Current solutions for monitoring and protecting these assets include horizontal directional drilling (HDD), reinforced pipelines, and drone surveillance of the pipeline ROW. While these methods offer some level of security, they have significant limitations in effectively deterring and addressing the real-time activities of intruders.

For instance, HDD and reinforced pipelines primarily focus on preventing physical breaches, but do not address the detection of actual intruders or the ongoing monitoring of pipeline ROWs. Drone surveillance, on the other hand, provides a visual overview but often falls short in continuous and real-time tracking, especially under adverse weather conditions or during night-time operations. These methods fail to provide an integrated approach that both detects intrusions and facilitates the immediate tracking and apprehension of perpetrators.

Moreover, the existing systems do not offer a scalable solution that can adapt to vast and geographically diverse pipeline networks, which is critical for countries with extensive pipeline infrastructures. The need for a comprehensive, real-time monitoring and response system is evident to minimize the impact of illegal activities and ensure the safety and integrity of pipeline assets.

Therefore, a pipeline intruder locator system that addresses pipeline asset theft by integrating advanced sensing technologies with real-time data processing and tracking capabilities is needed. This system detects intrusions using fiber-optic and satellite technologies and provides for continuous tracking of intruders beyond the initial point of detection. The system further provides for coordinating closely with security forces, public or private, to ensure rapid response and apprehension. This system addresses the critical gaps left by existing technologies, offering a more effective and efficient means of securing pipeline assets against unauthorized access and theft.

In light of the devices disclosed in the known art, it is submitted that the present invention substantially diverges in design elements and methods from the known art and consequently it is clear that there is a need in the art for a pipeline intruder locator system. In this regard the instant invention substantially fulfills these needs.

SUMMARY OF THE INVENTION

In view of the foregoing disadvantages inherent in the known types of pipeline intruder locator system now present in the known art, the present invention provides a new pipeline intruder locator system for enhancing the security and monitoring of pipeline rights of way (ROW). The system comprises a mapping system having fiber-optic sensors and satellite surveillance to delineate the ROW and enable accurate mapping and monitoring. An intruder detection system is operably connected to the mapping system and is configured to detect unauthorized presences, tag these presences as intruders, and assign a unique identification number to each detected intruder. Furthermore, the system includes a follow-on locator system that employs a satellite network to track the movement of these intruders in real-time once they move outside of the ROW. A communication interface is integrated into the system to facilitate the transmission of intruder location data to a computer system, such that security personnel can be rapidly deployed with real time information.

It is an objective of the present invention to offer a pipeline intruder locator system designed to provide comprehensive surveillance of pipeline rights of way (ROW). This system utilizes advanced technologies, such as fiber-optic sensors and satellite surveillance, to detect unauthorized intrusions and activities, enhancing security measures and reducing the incidence of oil theft and vandalism.

It is an objective of the present invention to offer a pipeline intruder locator system that facilitates real-time tracking and monitoring of intruders. The system assigns unique identification numbers to detected intruders and tracks their movements using geolocation technologies, enabling continuous monitoring even when the intruder moves outside of the initially mapped area.

It is yet another objective of the present invention to offer a pipeline intruder locator system that provides real-time data of intruders so as to facilitate the coordination and efficiency of response operations. Thus, the system significantly improves the likelihood of apprehending intruders and preventing further illegal activities.

Another objective of the present invention is to offer a pipeline intruder locator system that minimizes environmental and financial impacts of pipeline intrusions. The early detection and rapid response capabilities of the system are designed to reduce the frequency and severity of oil spills and other environmental damages, thereby safeguarding both ecological and economic interests.

It is an objective of the present invention to offer a pipeline intruder locator system adaptable for use in various geographical and infrastructural contexts. The flexibility and scalability of the system make it suitable for deployment in diverse pipeline networks, ensuring broad applicability and effectiveness across different regions and pipeline configurations.

It is therefore an object of the present invention to provide a new and improved pipeline intruder locator system that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
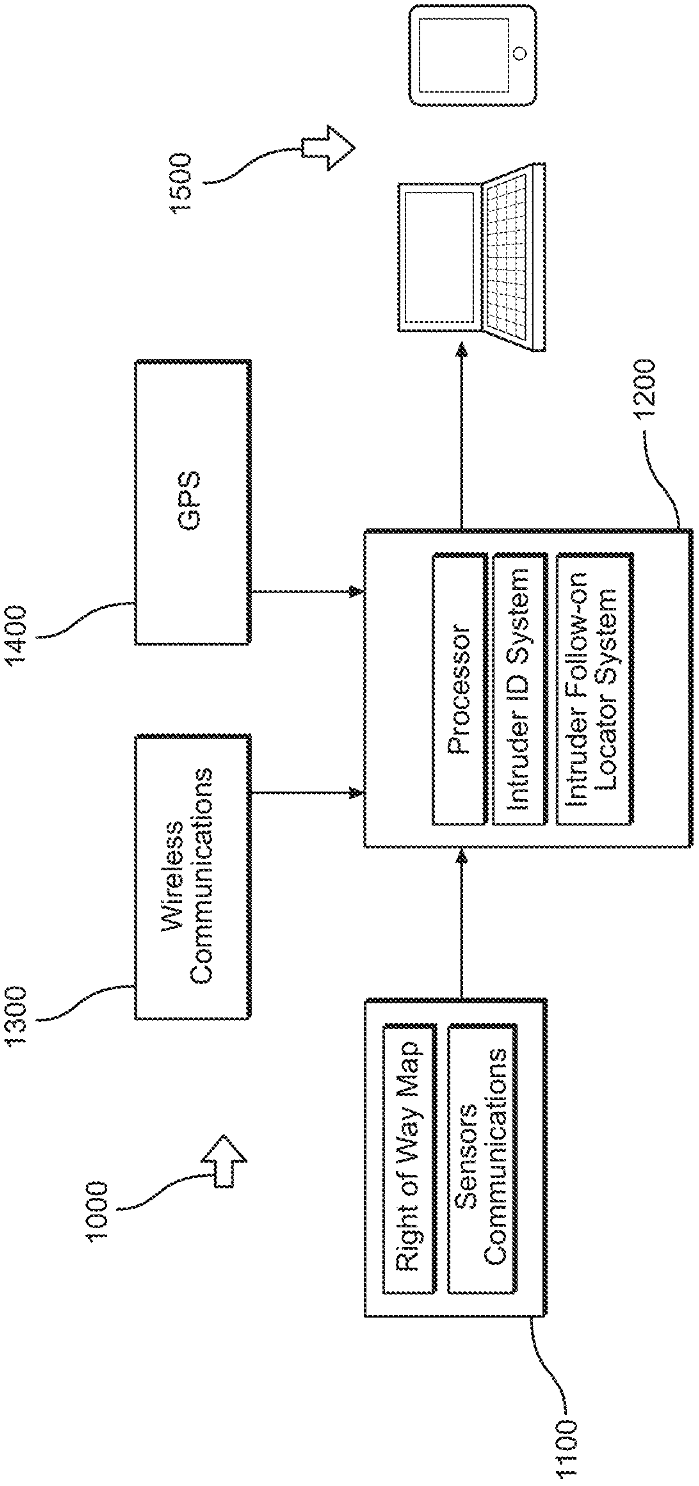
FIG. 1 shows a diagram of an embodiment of the pipeline intruder locator system.

Reference is made herein to the attached drawings. Like reference numerals are used throughout the drawings to depict like or similar elements of the system. For the purpose of presenting a brief and clear description of the present invention, the embodiment discussed will be used for providing security and monitoring of pipeline rights of way (ROW). The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment," "second embodiment," or "third embodiment" does not necessarily refer to the same embodiment.

As used herein, "computer-readable medium" or "memory" excludes any transitory signals, but includes any non-transitory data storage circuitry, e.g., buffers, cache, and queues, within transceivers of transitory signals. As used herein, "logic" refers to (i) logic implemented as computer instructions and/or data within one or more computer processes and/or (ii) logic implemented in electronic circuitry.

Referring to FIG. 1, there is shown a diagram of an embodiment of the pipeline intruder locator system. The pipeline intruder locator system 1000 provides for enhanced security and monitoring of pipeline rights of way (ROW) which allow authorities to detect, monitor, and respond to unauthorized intrusions into pipeline ROWs. As used herein, the ROW is land area over and around pipelines where certain rights are reserved for pipeline maintenance and operation. The pipeline intruder locator system 1000 comprises a mapping system 1100 configured to map the ROW of a pipeline using fiber-optic sensors and satellite surveillance technologies. The mapping system 1100 allows an intruder detection system 1200 to monitor the ROW effectively and detect any unauthorized presences. The area over which the mapping system 1100 functions is selected on several factors, including the geographical location of the pipeline and its surrounding environment, which may include urban areas, forests, or other terrains through which the pipeline passes. The ROW may be uploaded to the system to precisely defined through legal documentation and geographical data to ensure accurate surveillance coverage.

In one embodiment, fiber-optic sensors 1120 are installed along the ROW as part of the mapping system. These sensors are either buried alongside the pipeline or attached directly to it. They function primarily based on the principle of distributed acoustic sensing (DAS), which utilizes the inherent properties of fiber optics to detect vibrations and acoustic signals along the length of the fiber. When vibrations occur—such as those caused by digging, heavy machinery operation near the pipeline, or even foot traffic—the light signals within the fiber-optic cable are disturbed, and these disturbances are detected and analyzed.

In one embodiment, the intruder detection system 1200 is linked to the fiber-optic sensors 1120 and is tasked with interpreting the signals they emit. In one embodiment, the intruder detection system 1200 relies on artificial intelligence (AI) or image recognition technologies directly in the fiber-optic sensing part of the detection process. Alternatively, the intruder detection system 1200 analyzes the patterns of disturbances detected by the sensors to determine whether they match the characteristics of typical intruder activities, such as unauthorized digging or tampering.

In one embodiment, the intruder detection system 1200 is configured to distinguish authorized users from intruders. The system 1200 is configured to recognize specific signals or electronic tags carried by authorized personnel. These tags might emit signals detectable by the intruder detection system, ensuring that activities by personnel with legitimate access do not trigger the security protocols. This can be integrated through RFID (Radio-Frequency Identification) tags, smart badges, or other forms of electronic identification that are uniquely coded and recognized by the system's sensors.

In one embodiment, the intruder detection system 1200 is configured to tag the unauthorized presences as an intruder and assign a unique identification number to each detected intruder. A follow-on locator system 1400 comprises a satellite network configured to track the movement of the intruders in real-time outside of the ROW using geolocation technologies, such as GPS. In one embodiment, after a unique identification number has been assigned to each detected intruder, the satellite network is used to track the intruder. The unique identification number is linked with the specific location and time of the detected activity along with other relevant sensor data. Additionally, image recognition technologies may supplement this process by capturing visual data to confirm and enhance the tagging process. High-resolution cameras or satellite images provide visual documentation that aids in distinguishing the physical appearance or activities of the intruder, which is associated with the unique identification tag. Following the initial detection and tagging within the ROW, the intruder's position is tracked through real-time satellite tracking employing geolocation technologies. In one embodiment, the system often utilizes differential GPS (DGPS), which significantly refines the accuracy of traditional GPS systems. DGPS employs a network of fixed, ground-based reference stations which broadcast differences between the positions indicated by satellite systems and their known fixed positions.

In one embodiment, the intruder detection system 1200 includes a communication interface 1300 configured to transmit intruder location data to a computer system 1500. The computer system is remote computer system accessible by security or law enforcement agencies. The communications interface 1300 provides real-time updates to the computer system 1500 that allow for security management of the intruders. The interface 1300 sends data collected from the intruder detection and follow-on locator systems 1200, 1400. In some embodiments, the data includes detailed geographic coordinates of detected intruders, timestamps of their detection, and any visual data captured by integrated surveillance technologies. To safeguard this sensitive information, the data is encrypted using advanced encryption standards, such as the Advanced Encryption Standard (AES). Furthermore, in one embodiment the communication interface 1200 utilizes established secure communication protocols like Secure Sockets Layer (SSL) or Transport Layer Security (TLS) to transmit the encrypted data. These protocols ensure that a secure channel is maintained during data transmission, preventing unauthorized access and data breaches. The interface's 1300 capability to transmit data over diverse networks includes, but is not limited to wired, cellular, and satellite communications.

Figure 2:
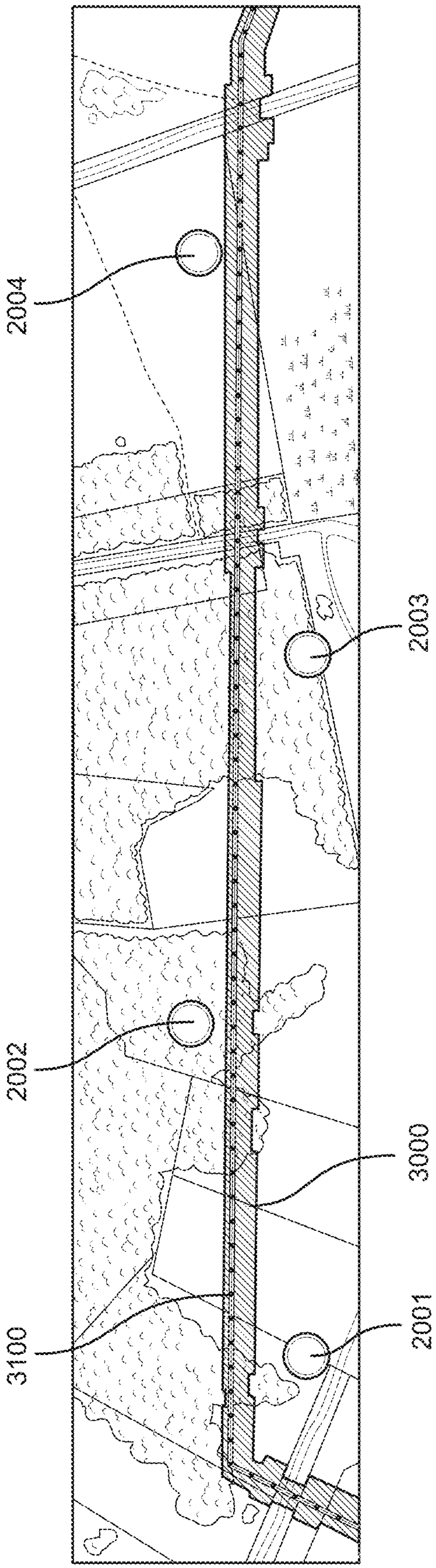
FIG. 2 shows a schematic view of an embodiment of the ROW of the pipeline intruder locator system with multiple intruders detected.
Figure 3:
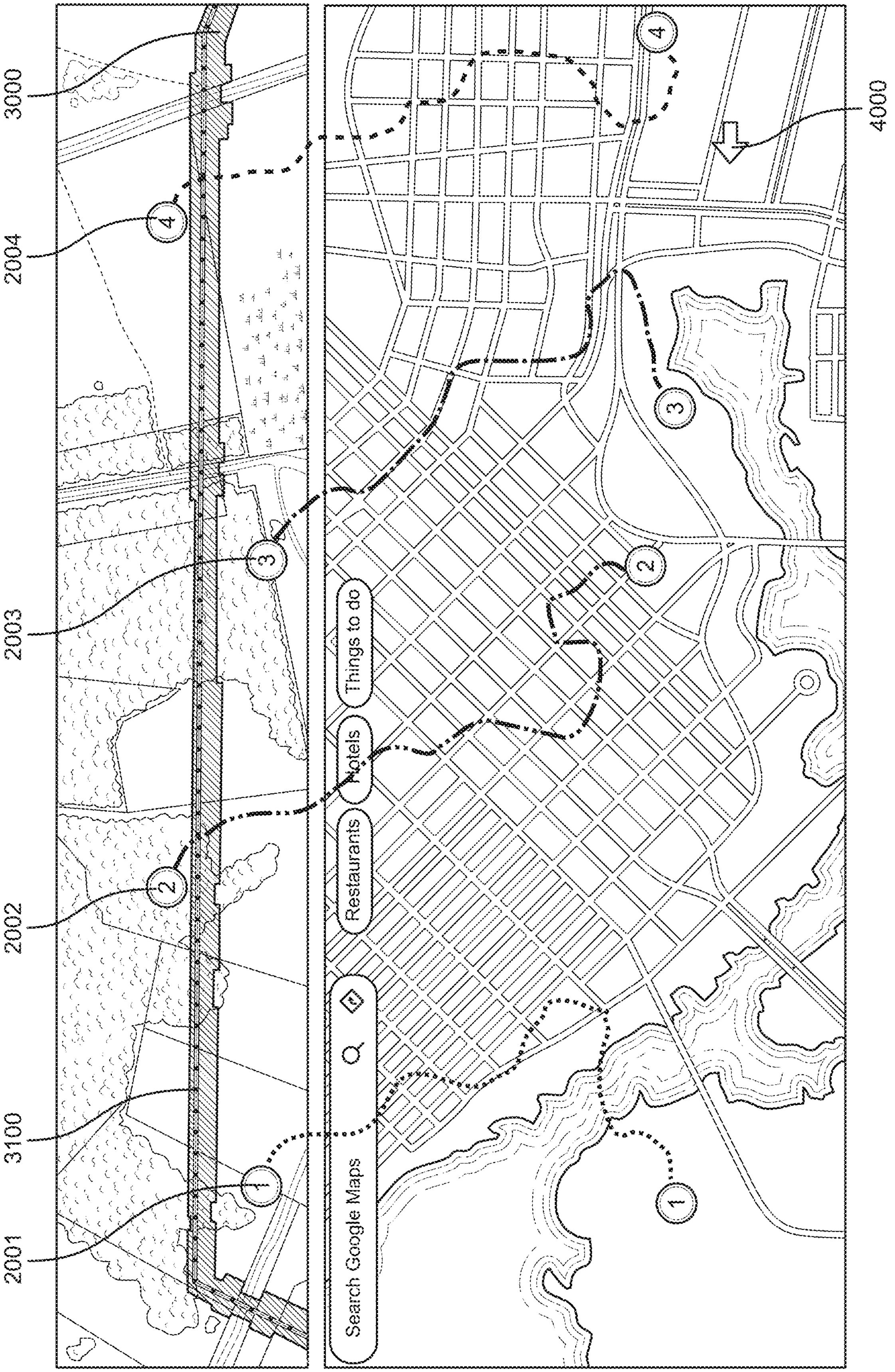
FIG. 3 shows a schematic view of an embodiment of the pipeline intruder locator system with multiple intruders identified from the ROW in a satellite overlay.

Referring to FIGS. 2 and 3, there is shown a schematic view of an embodiment of the ROW of the pipeline intruder locator system with multiple intruders detected and a schematic view of an embodiment of the pipeline intruder locator system with multiple intruders identified from the ROW in a satellite overlay, respectively. In the shown embodiment, the pipeline intruder locator system 1000 detects four unauthorized presences 2001, 2002, 2003, 2004 within the ROW 3000 and in close proximity to the pipeline 3100. This detection is achieved through the integrated use of fiber-optic sensors and satellite surveillance technologies, which are part of the mapping system. Each unauthorized presence triggers the intruder detection system, which then tags these presences with unique identification numbers and continuously monitors their movements within the ROW. In one embodiment, high-resolution cameras and satellite images are used to visually confirm disturbances detected by fiber-optic sensors. Image recognition can help differentiate between typical maintenance activities performed by authorized personnel and potential unauthorized intrusions. For the purpose of simplicity, these intruders have been labeled as Intruders 1 through 4. However, in other embodiments, the unique identification number includes detailed geographic coordinates of detected intruders, timestamps of their detection, and any other identifying information.

Referring now to FIG. 3, the map of the ROW and intruders has been expanded to include the surrounding area as each intruder moves away from the initial detection point within the ROW. A satellite overlay of a map of 4000 of a nearby city is shown, illustrating the paths of the intruders as they move toward or through the urban area. In one embodiment, the map is supplied from Google Maps™. The tracking lines map their real-time locations, updated dynamically via the follow-on locator system. The follow-on locator system utilizes advanced geolocation technologies, including differential GPS, to maintain accuracy in tracking the intruders' movements as they exit the ROW and enter more populated areas.

The data concerning the location and movement of each intruder is captured and processed in real time and transmitted directly to a central computer system via the communication interface. This interface ensures that the transmission is secure, utilizing encryption protocols to safeguard the data from unauthorized access. The information sent to the computer system includes not only the geographic coordinates and movement paths of each intruder but also timestamps and potentially visual data from surveillance cameras if available. This real-time information allows security agencies to deploy resources to intercept the intruders based on their current locations and projected paths as displayed in the satellite overlay.

In some embodiments, the intruder detection system further comprises an alert system configured to activate audible and/or visual alerts to notify security personnel when an intruder is detected within the ROW. In the illustrated embodiment, the alert system is configured to provide tiered notifications based on the proximity of the intruder to critical infrastructure within the pipeline system. The tiered notifications provide both a visual and audible alert to a first tier closest in proximity to the intruder location. A second tier receives an audible alert, wherein a third tier, furthest from the location (including personnel offsite) receives a text communication.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pipeline intruder locator system, comprising:

a mapping system configured to map a right of way (ROW) of a pipeline using fiber-optic sensors and satellite surveillance technologies;

an intruder detection system operably connected with the mapping system, wherein the intruder detection system is configured to:

detect unauthorized presences within the ROW;

tag the unauthorized presences as an intruder; and assign a unique identification number to each detected intruder;

a follow-on locator system comprising a satellite network configured to track movement of the intruder in real-time outside of the ROW using geolocation technologies;

a communication interface configured to transmit intruder location data to a computer system.

2. The pipeline intruder locator system of claim 1, wherein the fiber-optic sensors are further configured to detect disturbances caused by mechanical tools.

3. The pipeline intruder locator system of claim 1, wherein the satellite surveillance technologies include high-resolution imaging to assist in verifying detected intrusions.

4. The pipeline intruder locator system of claim 1, wherein the mapping system comprises a ground-penetrating radar configured to identify sub-surface anomalies.

5. The pipeline intruder locator system of claim 1, wherein the intruder detection system is further configured to activate an alarm system upon detection of an unauthorized presence.

6. The pipeline intruder locator system of claim 1, wherein the follow-on locator system uses differential GPS (DGPS) to track intruders outside of the ROW.

7. The pipeline intruder locator system of claim 1, wherein the communication interface is configured to encrypt the transmitted intruder location data.

8. The pipeline intruder locator system of claim 1, wherein the follow-on locator mechanism uses public mapping services to track the real-time location of intruders.

9. The pipeline intruder locator system of claim 1, further comprising an alert system that notifies security personnel when an intruder is detected within the ROW.

10. The pipeline intruder locator system of claim 9, wherein the alert system is configured to provide tiered notifications based on the proximity of the intruder to critical infrastructure within the pipeline system.

11. The pipeline intruder locator system of claim 1, wherein the communication interface includes capabilities for encrypted data transmission to ensure secure communication with security agencies.

* * * * *